Aug. 4, 1936.  R. C. BUELL  2,050,082
SUPPRESSION OF GROUND FAULTS ON ALTERNATING CURRENT SYSTEMS
Filed Dec. 12, 1935
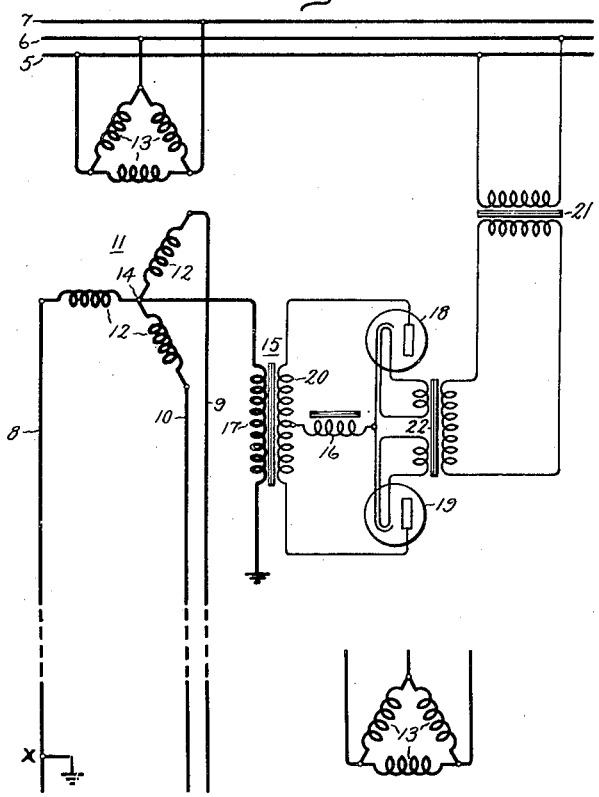
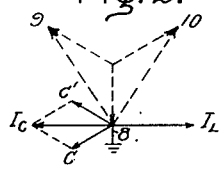
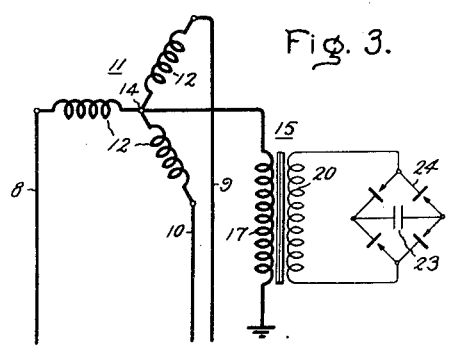
Inventor:
Roy C. Buell,
by Harry E. Dunham
His Attorney.

Patented Aug. 4, 1936

2,050,082

UNITED STATES PATENT OFFICE 2,050,082

SUPPRESSION OF GROUND FAULTS ON ALTERNATING CURRENT SYSTEMS

Roy C. Buell, Schenectady, N. Y., assignor to General Electric Company, a corporation of New York Application December 12, 1935, Serial No. 54,082

10 Claims. (Cl. 172—237)

My invention relates to improvements in the suppression of ground faults on A. C. systems, and more particularly to improvements in ground fault suppression devices, such as disclosed in United States Letters Patent 1,537,371, issued May 12, 1925. An object of my invention is to provide an improved ground fault suppression device which is automatically variable to correspond with the capacitance to ground of the system in service and which does not involve moving parts. This and other objects of my invention will appear in more detail hereinafter.

In the patent mentioned, there is disclosed a way of suppressing ground faults of a transient character on ungrounded A. C. systems. The suppression is effected by establishing at the ground fault point, by means of a suitable inductance device connected between a neutral of the system and ground, a flow of current practically opposite in phase to the unbalanced charging current to ground of the system and of such magnitude as to neutralize this current. Inasmuch as there is a critical value of neutralizing inductance for any system capacitance to ground, it is obvious that as parts of the system are put into or taken from service depending on load demands, faults, etc., the inductance device should have a variable inductance to suit the extent of the system in service. Attempts have been made to do this by manual operation of tap changing devices. But the human element involved and the rapid changes to which systems are subjected in case of faults are not productive of such dependability as present day electric service demands. Attempts have also been made to vary the compensating inductance automatically by continuously operating mechanical devices. These are not only costly to install, but also to operate and maintain, because of their load demand, wear on moving parts, inspection, and maintenance. In accordance with my invention, I provide an improved arrangement which automatically varies the inductance of the ground fault suppressing device on the occurrence of a ground fault and which involves no moving parts.

My invention will be better understood from the following description when taken in connection with the accompanying drawing, and its scope will be pointed out in the appended claims.

In the accompanying drawing, Fig. 1 illustrates diagrammatically an embodiment of my invention as applied to a three phase alternating current system, Fig. 2 is a vector diagram explanatory of ground fault suppression by inductive reactance devices connected between neutral and ground, and Fig. 3 illustrates diagrammatically another embodiment of my invention.

In Fig. 1, a part of a three phase A. C. system is represented by a station bus 5, 6, 7 to which a high voltage feeder circuit 8, 9, 10 is connected through a transformer 11 whose high voltage windings 12 are connected in star and whose low voltage windings 13 are delta connected. A neutral of the feeder circuit, such, for example, as the neutral 14 of the high voltage transformer windings 12, is connected to ground through an inductive reactance device 15. The function of this device is to supply, on the occurrence of a ground on a feeder circuit conductor, lagging current of an amount sufficient to suppress the unbalanced charging current to ground of that portion of the system in service.

The theory of this operation will be more clearly understood from the vector diagram of Fig. 2. When a conductor of a three-phase circuit of an A. C. system without a grounded neutral, such as conductor 8, becomes grounded as at $x$ for example, the voltage to ground of the other two conductors changes from star voltage to delta voltage. In Fig. 2, 8—9 and 8—10 represent the voltages to ground of the ungrounded feeder conductors 9 and 10 when a ground fault occurs on conductor 8. The voltages 8—9 and 8—10 produce leading or capacitance currents to ground 8—C and 8—C', respectively. The resultant of these, indicated as $I_c$, is the charging current to ground at the fault. This current, if opposed by an equal and opposite current $I_L$, will be suppressed so that in the case of grounds of a transient character the arc is extinguished quickly enough to avoid damage and interrupt service. The current $I_L$ is provided by the neutral reactance device 15, which is subjected to the star or leg voltage by reason of the ground on conductor 8, and the consequent rise in voltage of the neutral 14 above ground by an amount equal to the star voltage. Obviously, the value of $I_c$ will vary in dependence on the extent of the system in service. Consequently the value of $I_L$ must be adjusted to each value of $I_c$ if effective suppression is to be secured. If the amount of the system in service is increased, the capacitance to ground of the system increases and in accordance with the disclosure of the previously mentioned patent, the inductive reactance of the grounding device 15 must be decreased. On the other hand, if portions of the system are dropped because of decreased load demand or faults, the system capacitance to ground is decreased and the inductance of the grounding device 15 must be increased.

In accordance with my invention, I provide means for varying the inductance of the grounding device 15 through a predetermined range, at some point of which the current through the device on the occurrence of a ground on one of the feeder conductors becomes substantially equal in magnitude and opposite in phase to the charging current to ground of that portion of the system in service. As shown in Fig. 1, this means includes an inductance varying circuit which may include not only the device 15 but additionally may include another inductive reactance device 16. Further in accordance with my invention, I provide means for varying the inductance of the circuit to compensate the charging current to ground of the system. For this purpose, the neutral grounding device 15 may be a transformer whose primary winding 17 is connected between the neutral 14 and ground, and whose inductively coupled secondary winding conveniently provides the inductance varying circuit in conjunction with one or more rectifying means 18 and 19, which are connected to be energized in accordance with the current in the primary winding 15 of the neutral grounding transformer.

When the inductance device 16 is employed, it may have one end connected to the midpoint of the transformer secondary 20 of the transformer 15 and the rectifying means 18 and 19 are connected across the other end of the reactor 16 and the terminals of the transformer secondary 20.

The inductive reactance varying circuit may have a relatively long time constant so that its initial reactance, or the apparent reactance of the transformer 15, which is high, decreases slowly in consequence of the unidirectional current in the two halves of the secondary winding 20 and the reactor 16. Thus, initially the neutral grounding device 15 will have a high inductive reactance which corresponds to a small system with relatively small capacitance. However, as the unidirectional current in the inductance varying circuit increases the magnetic flux, the inductance of the grounding device 15 decreases in dependence on the time constant of the inductance varying circuit through a range of values corresponding to different capacitance values of the system. Consequently, at some point in the range, the inductance of the transformer 15 will be such as compared with the capacitance value of the system to result in the desired compensation of the unbalanced charging current to ground. It will be observed that this is accomplished without the necessity of any moving parts or changes dependent upon station operators or other attendants.

Any suitable rectifying means 18 and 19 may be employed, but I have chosen to illustrate electron discharge devices of the hot cathode heater type. The cathode excitation may be derived from the bus 5, 6, 7, through suitable means, such as a step-down transformer 21 and a filament or hot cathode transformer 22. Although I have illustrated valve type rectifying devices, any other rectifying means capable of reliably carrying the necessary current may be used.

Instead of beginning with an initially high inductance value of the grounding device, as in the arrangement shown in Fig. 1, I may use the arrangement shown in Fig. 2, wherein the initial value of the inductance of the grounding device 15 is low and increases through a predetermined range. For this purpose there may be connected in the inductance varying circuit for example across the secondary winding 20 of the transformer, a capacitance 23 which is supplied with unidirectional current through suitable rectifying means. In this embodiment of my invention I have illustrated a full-wave rectifier 24. This rectifying means is merely shown schematically because it will be obvious to those skilled in the art how any rectifying device, for example of the electron discharge type, may be connected. The A. C. terminals of the rectifier are connected to the terminals of the secondary winding 20, and the D. C. terminals to the condenser 23, as shown. With a rectifier arrangement of this type, it is unnecessary to bring out any median terminals from the transformer.

With this arrangement, the initial inductance of the transformer is merely that due to the leakage reactance of the transformer. However, as voltage builds up across the capacitance 23, the current in its circuit decreases and in consequence the current in the grounding transformer decreases. Thus, the inductance of the grounding transformer is increased through a range of values, some one of which is the critical value necessary to arc suppression for a given system capacitance.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination, an alternating current electric system having a neutral point and a variable capacitance to ground dependent on the amount of the system in service, an inductive reactance device connected between said neutral point and ground, and means for varying the inductance of said device through a predetermined range at some point of which the current through the device on the occurrence of a ground on a phase conductor of the system becomes substantially equal in magnitude but opposite in phase to the charging current to ground of the system in service, including an inductance varying circuit connected to be energized in dependence on the current of said device, and rectifying means connected in said inductance varying circuit.

2. In combination, an alternating current electric system having a neutral point and a variable capacitance to ground dependent on the amount of the system in service, a transformer having its primary winding connected between said neutral point and ground and having an initially high inductance on the occurrence of a ground on the system, and means for varying the inductance of said transformer through a predetermined range at some point of which the current in its primary winding is substantially equal in magnitude but opposite in phase to the charging current to ground of the system in service, including an inductance device connected in circuit with the secondary winding of said transformer, and means for energizing said inductance device by a unidirectional current dependent on the magnitude of the current in the primary winding whereby to decrease the inductance of the circuit between the neutral point and ground.

3. In combination with an alternating current electric system having a neutral point and a variable capacitance to ground dependent on the amount of the system in service, a transformer having its primary winding connected between said neutral point and ground and having a predetermined initial inductance on the occurrence of a ground on the system, means operative on the occurrence of a ground on a phase conductor of the system for varying the inductance of said transformer through a predetermined range at some point of which the current in the primary winding is such as to suppress the charging current to ground of the system in service including rectifying means connected in circuit with the secondary of the transformer for permitting a unidirectional current flow in predetermined portions of the secondary windings.

4. In combination with an alternating current electric system having a neutral point and a variable capacitance to ground dependent on the amount of the system in service, a transformer having its primary winding connected between said neutral point and ground, means operative on the occurrence of a ground on a phase conductor of the system for varying the inductance of said transformer through a predetermined range at some point of which the current in the primary winding is such as to suppress the charging current to ground of the system in service including rectifying means connected to be energized in accordance with the current flowing in the primary winding of the transformer.

5. In combination, an alternating current electric system having a neutral point and a variable capacitance to ground dependent on the amount of the system in service, an inductive reactance device connected between said neutral point and ground and having an initially high inductance on the occurrence of a ground on a phase conductor of the system, and means for slowly decreasing the inductance of said device through a predetermined range at some point of which the current through the device on the occurrence of a ground on a phase conductor of the system is such as to suppress the charging current to ground of the system in service including an inductance varying circuit having a long time constant and connected to be energized in dependence on the current of said device, and rectifying means connected in said inductance varying circuit.

6. In combination with an alternating current electric system having a neutral point and a variable capacitance to ground depending on the amount of the system in service, a transformer having its primary winding connected between said neutral point and ground and having an initially high inductance upon the occurrence of a ground on the system, means operative on the occurrence of a ground on a phase conductor of the system for decreasing the inductance of said transformer through a predetermined range at some point of which the current in the primary winding is such as to suppress the charging current to ground of the system in service, including rectifying means connected in circuit with the secondary winding of the transformer.

7. In combination with an alternating current electric system having a neutral point and a variable capacitance to ground depending on the amount of system in service, a transformer having its primary winding connected between said neutral point and ground and having an initially high inductance upon the occurrence of a ground on the system, means operative on the occurrence of a ground on a phase conductor of the system for decreasing the inductance of said transformer through a predetermined range at some point of which the current in the primary winding is such as to suppress the charging current to ground of the system in service, including an inductive reactance device having one end connected to the midpoint of the secondary winding of said transformer and two rectifying devices respectively connected across the other end of said inductive reactance device and the terminals of the secondary winding of the transformer to provide uni-directional current flow in said inductive reactance device.

8. In combination with an alternating current electric system having a neutral point and a variable capacitance to ground depending on the amount of the system in service, a transformer having its primary winding connected between said neutral point and ground and having an initially low inductance upon the occurrence of a ground on the system, means operative on the occurrence of a ground on a phase conductor of the system for increasing the inductance of said transformer through a predetermined range at some point of which the current in the primary winding is such as to suppress the charging current to ground of the system in service including rectifying means connected in circuit with the secondary winding of the transformer.

9. In combination with an alternating current electric system having a neutral point, an impedance device having a winding connected between said neutral point and ground, another winding inductively coupled with said first winding, and means for causing a current of a character different from the system current to flow through said other winding when a ground occurs on said system.

10. In combination with an alternating current electric system having a neutral point, an impedance device having two inductively coupled windings one of which is connected between said neutral point and ground, and means for causing a relatively slowly changing amount of unidirectional current to flow through the other winding when a ground occurs on said system whereby to change the impedance of said device.

ROY C. BUELL.